United States Patent [19]
Miller

[11] Patent Number: 5,868,166
[45] Date of Patent: Feb. 9, 1999

[54] PRESSURE REGULATING VALVE

[75] Inventor: Mark D. Miller, Montgomery, Ill.

[73] Assignee: Caterpillar Inc., Peoria, Ill.

[21] Appl. No.: 672,124

[22] Filed: Jun. 27, 1996

[51] Int. Cl.$^6$ ................................................ F16K 11/16
[52] U.S. Cl. .......................... 137/625.27; 137/627.5; 137/596; 137/636; 251/77; 251/297
[58] Field of Search ................... 137/625.25, 625.27, 137/627.5, 596, 636; 251/77, 297

[56] References Cited

U.S. PATENT DOCUMENTS

| | | | |
|---|---|---|---|
| 1,850,209 | 3/1932 | Knox | 137/596 X |
| 2,075,600 | 3/1937 | Baker | 137/636 |
| 2,850,036 | 9/1958 | Hilkemeier | 137/636 X |
| 2,905,462 | 9/1959 | Christensen | 137/627.5 X |
| 3,414,073 | 12/1968 | Hurwitz | 137/636 X |
| 3,477,463 | 11/1969 | Worden | 137/596 X |
| 3,533,425 | 10/1970 | Hannan | 137/627.5 X |
| 3,896,840 | 7/1975 | Anderson | 137/625.27 |
| 3,933,176 | 1/1976 | Wheeler | 137/596 |
| 4,445,538 | 5/1984 | Bilski | 137/636 X |
| 4,955,442 | 9/1990 | Crabb et al. | 180/6.44 |
| 5,558,125 | 9/1996 | Sell | 137/627.5 X |

*Primary Examiner*—John Rivell
*Attorney, Agent, or Firm*—John W. Grant; J. W. Burrows

[57] ABSTRACT

A pressure regulating valve usable in combination with a hydraulic steering system has a spring mechanism axially disposed between a pair of axially aligned valve spools. Movement of the spring mechanism in a first direction resiliently moves one of the valve spools to a position for communicating an inlet port with a control port and regulating the pressure in the the control port so that the pressure is proportional to the degree of movement of the spring mechanism. Conversely, movement of the spring mechanism in a second direction resiliently moves the other valve spool to a position for communicating the inlet port with another control port and regulating the pressure in the other control port so that the pressure is proportional to the degree of movement of the spring mechanism.

4 Claims, 1 Drawing Sheet

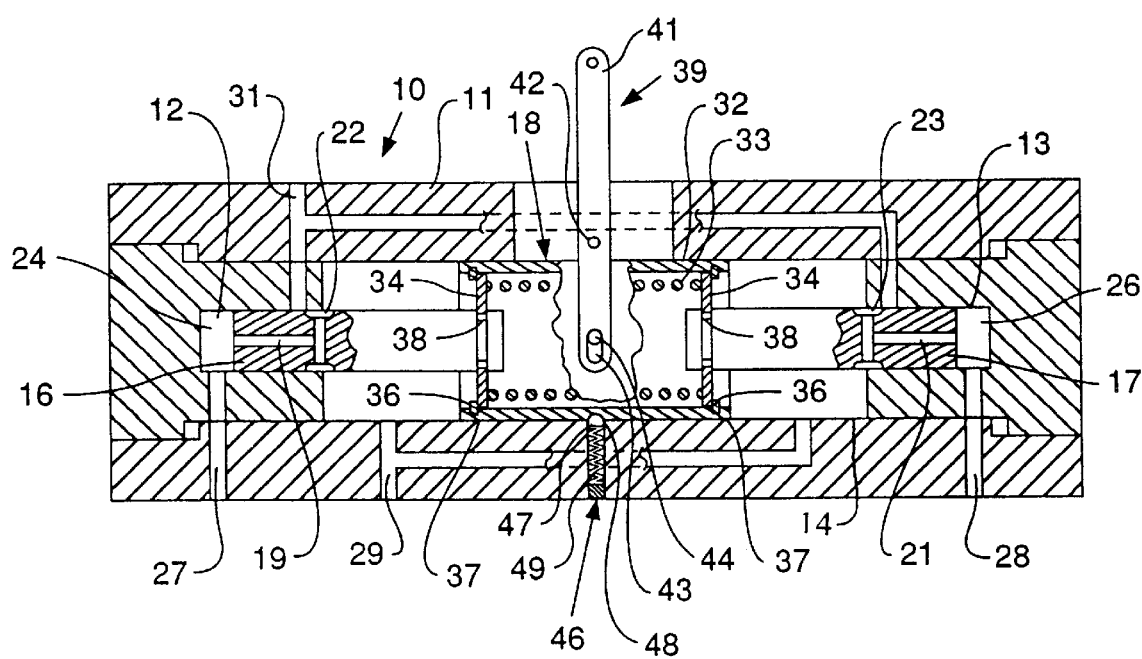

PRESSURE REGULATING VALVE

TECHNICAL FIELD

This invention relates generally to a pressure regulating valve and, more particularly, to one in which substantially equal ramp up pressures are individually provided at a pair of control ports.

BACKGROUND ART

U.S. Pat. No. 4,955,442 illustrates a steering mechanism for converting the rotational movement of a steering wheel to linear actuation of one or the other of a pair of pressure regulating valves connected to the main hydraulic steering control. That mechanism includes an input shaft and a single actuating cam which are co-jointly rotatable away from a neutral position in either direction. A cam follower assembly is cooperatively associated with a substantially spiral shaped cam slot defined in the actuating cam and includes a cam following roller wheel received in a guide slot. The cam follower assembly also includes a bell crank supporting the roller wheel and indirectly connected to the pilot valves so that rotating the input shaft in opposite directions imparts controlled displacement of the pressure regulating valves through a separate spring in each control valve.

One of the problems encountered therewith is that the spring tolerances of the valves must be tightly controlled to provide equal control pressures at the control port of each valve relative to a steering input so that rotating the steering wheel equally in opposite directions from the straight ahead position results in the same degree of left or right steering. Moreover, the preload on the springs must be precisely matched to insure that the initial ramp-up control pressures for left and right turns are equal so that steering commences at the same degree of steering wheel rotation from the straight ahead position. The term ramp-up control pressure commonly refers to the minimum regulated control pressure setting of a pressure regulating or pressure control valve and is a function of the spring preload.

Thus, it would be desirable to have a pressure regulating valve for use in a steering system for providing substantially equal ramp-up control pressures and substantially equal rates of pressure rise of the regulated control pressures in both directions of operation.

DISCLOSURE OF THE INVENTION

In one aspect of the present invention, a pressure regulating valve connectible to a source of pressurized fluid and having a pair of control ports comprises a pair of spaced axially aligned valve spools movable in opposite directions to regulate the pressure in the control ports and a spring mechanism disposed between and in axial alignment with the valve spools to resiliently move one of the spools upon movement of the spring mechanism in a first direction and to resiliently move the other spool upon movement of the spring mechanism in a second direction.

BRIEF DESCRIPTION OF THE DRAWINGS

The sole FIGURE is a diagrammatic cross sectional view of an embodiment of the present invention.

BEST MODE FOR CARRYING OUT THE INVENTION

A pressure regulating valve 10 includes a composite body 11 having a pair of axially aligned bores 12,13 disposed on opposite sides of a bore 14 centrally disposed therebetween, a pair of valve spools 16,17 slidably disposed within the bores 12,13, and a spring mechanism 18 disposed within the bore 14 between and in axial alignment with the valve spools.

Each valve spool 16,17 includes a passageway 19,21 connecting an annular groove 22,23 with a control chamber 24,26 formed in the body and which continuously communicates with a control port 27,28. In the neutral position of the valve spools as shown in the drawing, the annular grooves communicate with a drain passage 29 and are blocked from a common inlet port 31.

The spring mechanism 18 includes a tubular housing 32 slidably disposed within the bore 14, a compression coil spring 33 disposed within the housing in a preloaded condition between a pair of force transmitting members in the form of "C" shaped retainers 34, and a pair of annular retainers 36 seated in a pair of grooves 37 in the housing. Each "C" shaped retainer is seated in an annular groove 38 in the associated valve spool 16,17.

A means 39 is provided for moving the spring mechanism 18 in opposite directions from the neutral position shown so that the valve spools 16,17 are resiliently moved in the bores. The means 39 in this embodiment is a lever 41 pivoted on a pivot 42 and having a slot 43 therein slidably receiving a pin 44 extending radially outwardly from the housing 32. Alternatively, the moving means can include a sleeve rotatably disposed on the housing and having a cam slot therein receiving the pin.

A resilient detent 46 is disposed within the body and includes a ball 47 resiliently biased toward the housing 32 by a spring 49. The ball engages a pocket 48 in the housing to mechanically locate and resiliently restrain the spring mechanism 18 at the neutral position shown.

Industrial Applicability

In one use of the pressure regulating valve 10, the inlet port 31 is connected to a pump, the control ports 27,28 are connected to a hydraulic steering control and the lever 41 is suitably connected to a steering input so that the lever can be pivoted in opposite directions from the neutral position shown.

In this environment, generating a regulated control pressure in the control port 27, for example, is established by pivoting the lever 41 clockwise about the pin 42 as viewed in the drawing to move the spring mechanism 18 leftward. This causes the spring 33 to exert an input force for moving the valve spool 16 leftward to block communication between the control port 27 and the drain passage 29 and to establish communication between the inlet port 31 and the control port 27 for regulating the pressure in the control port 27. The pressurized fluid in the control chamber 24 acts on the end of the valve spool 16 creating a feedback force biasing the valve spool 16 rightward against the bias of the spring 33 so that the control pressure in the control port is maintained at a level proportional to the input force exerted by the spring 33 and thus is also proportional to the degree of leftward movement of the spring mechanism 18. Pivoting the lever 41 counterclockwise moves the spring mechanism 18 back to the neutral position shown and returns the valve spool 16 to its neutral position at which the control port 27 communicates with the drain port 29 and is blocked from the inlet port 31.

A regulated control pressure is similarly generated in the control port 28 by pivoting the lever 41 counterclockwise from the neutral position causing the spring 33 of the spring mechanism to move the valve spool 17 rightward to communicate the inlet port 31 with the control port 28 for regulating the control pressure in the control port 28 so that it is proportional to the degree of rightward movement of the spring mechanism.

In view of the above, it is readily apparent that the structure of the present invention provides an improved pressure regulating valve which provides substantially equal ramp-up regulated control pressures and substantially equal rates of pressure rise of the regulated control pressures in both directions of operation. This is accomplished by the use of a single preloaded spring disposed between and in alignment with the valve spools so that moving the spring in opposite directions provides the input to both valve spools thereby ensuring that the input forces are equal in both directions of operation.

Other aspects, objects and advantages of this invention can be obtained from a study of the drawings, the disclosure and the appended claims.

I claim:

1. A pressure regulating valve connectable to a source of pressurized fluid comprising:

a pair of control ports;

a pair of spaced axially aligned valve spools movable in opposite directions to regulate the pressure in the respective control ports; and a spring mechanism disposed between and in axial alignment with the valve spools to resiliently move one of the spools upon movement of the spring mechanism in a first direction and to move the other spool upon movement of the spring mechanism in a second direction, the spring mechanism including a tubular housing and a spring disposed within the housing in a preloaded condition, and a pair of force transmitting members disposed at opposite ends of the spring and positioned for engagement with the spools.

2. The pressure regulating valve of claim 1 wherein the regulated pressure in each of the control ports is proportional to the axial movement of the spring mechanism.

3. The pressure regulating valve of claim 2 including means for moving the spring mechanism in opposite directions.

4. The pressure regulating valve of claim 3 wherein the spring mechanism has a neutral position and including a detent disposed to mechanically locate and resiliently restrain the spring mechanism at the neutral position.

\* \* \* \* \*